(12) United States Patent
Jeon et al.

(10) Patent No.: US 9,662,856 B2
(45) Date of Patent: May 30, 2017

(54) DISPLAY, FRONT COVER THEREOF, MOLD OF FRONT COVER, AND MANUFACTURING METHOD FOR FRONT COVER

(71) Applicant: Samsung Electronics Co., Ltd., Suwon-si (KR)

(72) Inventors: Sang Bong Jeon, Yongin-si (KR); Sang Hak Kim, Suwon-si (KR); Hyun Jun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1012 days.

(21) Appl. No.: 13/706,999

(22) Filed: Dec. 6, 2012

(65) Prior Publication Data
US 2014/0162026 A1    Jun. 12, 2014

Related U.S. Application Data

(63) Continuation of application No. 12/241,306, filed on Sep. 30, 2008, now Pat. No. 8,339,535.

(30) Foreign Application Priority Data

Dec. 28, 2007  (KR) .................. 10-2007-0139628
Apr. 11, 2008  (KR) .................. 10-2008-0033769

(51) Int. Cl.
*B32B 3/26* (2006.01)
*G02F 1/1333* (2006.01)

(52) U.S. Cl.
CPC ........ *B32B 3/263* (2013.01); *B32B 2307/402* (2013.01); *B32B 2307/412* (2013.01);
(Continued)

(58) Field of Classification Search
CPC .............. B32B 3/263; B32B 2307/402; B32B 2307/412; B32B 2307/414;
(Continued)

(56) References Cited

U.S. PATENT DOCUMENTS 5,442,374 A    8/1995  Koizumi
5,971,556 A  * 10/1999  Carter ................... G01D 11/28
                                                   359/360
(Continued)

FOREIGN PATENT DOCUMENTS

DE    102008008671    9/2008
JP    6-118886        4/1994
(Continued)

OTHER PUBLICATIONS

European Decision on Grant dated Sep. 15, 2015 in European Patent Application No. 08868570.6.
(Continued)

*Primary Examiner* — Catherine A Simone
(74) *Attorney, Agent, or Firm* — Staas & Halsey LLP

(57) ABSTRACT

The present invention provides a display improved in an exterior appearance by a front cover, and a manufacturing method thereof, wherein the front cover covers a display panel and includes a translucent layer which transmits colored light, and a transparent layer to receive and transmit the colored light, wherein the translucent layer and the transparent layer are integrally formed. The front cover may be capable of implementing a natural tone variation thereon.

21 Claims, 15 Drawing Sheets

(52) U.S. Cl.
CPC ..... *B32B 2307/414* (2013.01); *B32B 2457/20* (2013.01); *B32B 2571/00* (2013.01); *G02F 2001/13332* (2013.01); *Y10T 428/24612* (2015.01)

(58) Field of Classification Search
CPC ............ B32B 2457/20; B32B 2571/00; B32B 2457/202; B32B 2457/204; B32B 2457/206; B32B 2457/208; B32B 3/00; B32B 3/28; B32B 3/30; G02F 2001/13332; Y10T 428/24612; Y10T 428/24479; G06F 1/1601; B29C 45/0055; B29C 45/0053; B29C 45/561
USPC .......................................... 428/156, 161, 172
See application file for complete search history.

(56) References Cited

U.S. PATENT DOCUMENTS

| | | | |
|---|---|---|---|
| 6,534,163 | B1 | 3/2003 | Takatsu |
| 6,862,148 | B2 | 3/2005 | Kakinoki et al. |
| 6,977,808 | B2 | 12/2005 | Lam et al. |
| 7,440,264 | B2 | 10/2008 | Lam et al. |
| 7,679,893 | B2 | 3/2010 | Lam et al. |
| 7,724,509 | B2 | 5/2010 | Lam et al. |
| 2003/0161093 | A1 | 8/2003 | Lam et al. |
| 2004/0004827 | A1 | 1/2004 | Guest |
| 2004/0064990 | A1 | 4/2004 | Kakinoki et al. |
| 2004/0071453 | A1 | 4/2004 | Valderas |
| 2004/0173940 | A1 | 9/2004 | Yuhara et al. |
| 2005/0270244 | A1 | 12/2005 | Lam et al. |
| 2005/0270733 | A1* | 12/2005 | Lam ................. G06F 1/1616 361/679.26 |
| 2005/0270734 | A1 | 12/2005 | Lam et al. |
| 2006/0207131 | A1* | 9/2006 | MacNeil ................. B60R 13/10 40/209 |
| 2009/0009942 | A1* | 1/2009 | Hsu ................... B29C 45/14811 361/679.09 |
| 2009/0009947 | A1 | 1/2009 | Lam et al. |
| 2009/0257232 | A1 | 10/2009 | Lam et al. |

FOREIGN PATENT DOCUMENTS

| | | |
|---|---|---|
| JP | 2001077546 | 3/2001 |
| JP | 2001100650 | 4/2001 |
| JP | 2007-183392 | 7/2007 |
| JP | 2007-194625 | 8/2007 |
| KR | 20060076139 | 7/2006 |

OTHER PUBLICATIONS

European Summons to Attend Oral Proceedings issued Apr. 10, 2015 in European Patent Application No. 08868570.6.
Chinese Office Action issued Dec. 31, 2011 in CN Application No. 200880123073.2.
European Search report issued on Sep. 6, 2012 in EP Patent Application No. 08868570.6.
Restriction Requirement for U.S. Appl. No. 12/241,306 dated Dec. 17, 2009.
Restriction Requirement for U.S. Appl. No. 12/241,306 dated Apr. 4, 2010.
Office Action for U.S. Appl. No. 12/241,306 dated Aug. 19, 2010.
Office Action for U.S. Appl. No. 12/241,306 dated Feb. 7, 2011.
Advisory Action for U.S. Appl. No. 12/241,306 dated Apr. 15, 2011.
Office Action for U.S. Appl. No. 12/241,306 dated Jan. 20, 2012.
Notice of Allowance for U.S. Appl. No. 12/241,306 dated Jul. 30, 2012.

* cited by examiner

DISPLAY, FRONT COVER THEREOF, MOLD OF FRONT COVER, AND MANUFACTURING METHOD FOR FRONT COVER

CROSS-REFERENCE TO RELATED APPLICATIONS

This application is a Continuation Application of prior application Ser. No. 12/241,306 filed on Sep. 30, 2008 now U.S. Pat. No. 8,339,535 in the United States Patent and Trademark Office, which claims the benefit under 35 U.S.C. §119(a) from Korean Patent Applications No. 10-2007-139628, filed on Dec. 28, 2007 and No. 10-2008-0033769 filed on Apr. 11, 2008, in the Korean Intellectual Property Office, the disclosures of which are incorporated herein in their entirety by reference.

BACKGROUND OF THE INVENTION

1. Field of the Invention

The present general inventive concept relates to a display, and more particularly to a display improved in a front exterior thereof, a front cover thereof, a mold for injection molding of the front cover, and a manufacturing method for the front cover.

2. Description of the Related Art

Displays are devices used to display images on a screen. A liquid crystal display (LCD) and a plasma display panel (PDP) are representative examples of the display.

Generally, such a display includes a display module which implements an image, a front cover which covers a front periphery of the display module, and a rear cover which covers a rear side of the display module.

According to advancement of the displays, a design for satisfying users' diverse aesthetic senses, as well as basic functions, is becoming a significant factor of the display. Since the front cover is the most noticeable portion of the display, an impression of the product highly depends on a design of the front cover. Therefore, an improvement in the design of the front cover would be most effective in carrying a refined impression of the product to the users.

In order to improve the exterior appearance of the front cover, in general, a surface of the front cover may be polished or colored. Otherwise, a dedicated ornament may be attached to the front cover.

However, achieving a refined look of the front cover using the above methods remains difficult, and there is a further need for a more refined look for front covers.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present general inventive concept provides a display having an improved exterior appearance, a front cover thereof capable of implementing a natural tone variation thereon, a mold for injection molding of the front cover, and a manufacturing method for the front cover.

Another aspect of the present general inventive concept provides a display having an improved exterior appearance using a front cover of a display, the front cover including a translucent layer which transmits colored light; and a transparent layer to receive and transmit the colored light, wherein the translucent layer and the transparent layer are integrally formed. The transparent layer may be disposed behind the translucent layer, or vice versa. Alternatively, the transparent layer is not necessarily required to be consistent with the present general inventive concept of providing a display having an improved exterior appearance.

Another aspect of the present general inventive concept provides a front cover having the translucent layer and the transparent layer integrally formed, and a variation portion in order to achieve a tone variation. The variation portion may include an additional material (e.g., translucent film, paint, etc.) which may be disposed between the translucent layer and the display, or the variation portion may be disposed between the transparent layer and the display.

Another aspect of the present general inventive concept provides a display, a front cover thereof, a mold for injection molding of the front cover, and a manufacturing method for the front cover, capable of simplifying a process of improving an exterior appearance of the front cover.

The present general inventive concept also provides a display having an improved exterior appearance, a front cover to implement various patterns based on a color variation to thereby improving the exterior appearance, a mold for injection molding of the front cover, and a manufacturing method for the front cover.

The present general inventive concept also provides a display, a front cover thereof, a mold for injection molding of the front cover, and a manufacturing method for the front cover, capable of preventing leakage of a second molded material during manufacturing of the front cover through first and second injection molding processes.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a display including a display module to implement an image, a front cover to cover a front periphery of the display module and including a translucent layer provided to the front cover to implement a tone variation on an exterior appearance of the front cover.

The translucent layer may be used to achieve a tone variation by imparting differences of an optical transmittance. For example, the translucent layer may include a thickness variation portion having a varied thickness to achieve the tone variation.

Alternatively, the front cover may further have a separate variation portion to achieve the tone variation, wherein the variation portion includes an additional material (e.g., translucent film, paint, etc.) which may be disposed between the translucent layer and the display, or the variation portion may be disposed between the transparent layer and the display.

Alternatively, the translucent layer may include a first and a second portion such that, in order to achieve a tone variation, a color of a first portion of the translucent layer may be different from a color of the second portion so that a tone variation occurs between the first and second portions of the translucent layer.

The front cover may be further formed such that a transparent layer transmits the tone variation through the front cover. However, those skilled in the art would recognize that the transparent layer is not necessarily required to be consistent with the present general inventive concept.

The front cover may be formed by double injection molding so that the transparent layer and the translucent layer are integrally formed with each other.

At least a portion of the transparent layer, adjoining a border between the transparent layer and the translucent layer, is slanted at a predetermined angle, and corners of the transparent layer and the translucent layer which disposed on the border are in contact with each other.

The portion of the transparent layer, adjoining the border between the transparent layer and the translucent layer, and another portion of the transparent layer may be nonlinearly disposed.

The thickness variation portion may become thinner in an outwardly direction of the front cover.

The thickness variation portion may include at least one penetrated portion so that the translucent layer is formed discontinuously.

Alternatively, at least one of the translucent layer and the transparent layer may include at least one penetrated portion so that the at least one of the translucent layer and the transparent layer is formed discontinuously.

The front cover may include an upper portion, a lower portion, a left portion and a right portion, and the at least one penetrated portion may be formed in at least one of the upper, lower, left and right portions.

The thickness variation portion may include at least one uneven portion.

Alternatively, at least one of the translucent layer and the transparent layer may include at least one uneven portion.

The uneven portion may be formed adjoining at least one of the transparent layer or the translucent layer.

The front cover may include an upper portion, a lower portion, a left portion and a right portion, and the at least one uneven portion is formed in at least one of the upper, lower, left and right portions while forming a predetermined pattern.

The translucent layer may be disposed behind the transparent layer, or vice versa.

The translucent layer may include a first translucent portion disposed at a front side of the display module and a second translucent portion extended in an outwardly direction of the display module, and the thickness variation portion is formed at the second translucent portion.

The thickness variation portion may be disposed in a space formed by connection between the front cover and the rear cover to cover a rear side of the display module.

The display may further include at least one reflection member which is disposed at a rear portion of the thickness variation portion to reflect light toward the thickness variation portion.

The front cover may include an upper portion, a lower portion, a left portion and a right portion, and the at least one reflection member is mounted corresponding to at least one of the upper, lower, left and right portions.

The reflection member may have a white color.

The display may further include a light source disposed at a rear portion of the thickness variation portion.

The rear cover may form a receiving space therein for the display module by connection with the front cover, and the translucent layer may include a first translucent portion disposed in the receiving space, and a second translucent portion extended in an outwardly direction of the receiving space.

The thickness variation portion may be formed at the second translucent portion.

The translucent layer may further include a supporting protrusion to protrude toward the front periphery of the display module.

The foregoing and/or other aspects and utilities of the general inventive concept may also be achieved by providing a manufacturing method of a front cover of a display, the method including firstly injection molding a transparent layer, and secondly injection molding a translucent layer including a thickness variation portion, from the transparent layer.

The thickness variation portion may become thinner in an outwardly direction of the front cover.

The translucent layer may be disposed behind the transparent layer, or vice versa.

The second injection molding applies a sealing mold which compresses the firstly injection molded transparent layer to prevent leakage of a second molded material for the translucent layer.

The sealing mold compresses border portions between the firstly injection molded transparent layer and the translucent layer that will be secondly injection molded, corresponding to a shrinkage of the transparent layer.

The transparent layer may be compressed a distance in a range of 0.05 mm to 0.2 mm.

The foregoing and/or other aspects and utilities of the general inventive concept may also be achieved by providing an injection mold for a front cover of a display, the injection mold including a sealing mold to compress a first molded material along borders between the first molded material and a second molded material molded on the first molded material.

The sealing mold may compress the first molded material corresponding to a shrinkage of the first molded material.

The first molded material becomes a transparent layer for a front cover of the display, and the second molded material becomes a translucent layer for the front cover.

The foregoing and/or other aspects and utilities of the general inventive concept may also be achieved by providing a front cover constituting a front exterior of the display, the front cover including a first molded material formed by first injection molding and a second molded material formed by second injection molding, wherein first molded material includes a compression portion formed by injection molds.

The compression portion may compress the first molded material along the border with the second molded material molded on the first molded material.

The compression portion compresses the first molded material corresponding to a shrinkage of the first molded material.

The first molded material becomes a transparent layer, and the second molded material becomes a translucent layer having a predetermined color.

The foregoing and/or other aspects and utilities of the general inventive concept may also be achieved by providing a front cover usable with a display having a display module, the front cover including a translucent layer including a thickness variation portion having a varied thickness to achieve a tone variation, and a transparent layer proximate to the translucent layer to transmit the tone variation.

The transparent layer may transmit the tone variation by differences of an optical transmittance.

The transparent layer and the translucent layer may surround the display module of the display.

The foregoing and/or other aspects and utilities of the general inventive concept may also be achieved by providing a front cover usable with a display having a display module, the front cover including a transparent layer to transmit light, and a non-transparent layer to transmit the light toward the transparent layer to change a tone varying along a length of the transparent layer.

BRIEF DESCRIPTION OF THE DRAWINGS

These and/or other aspects and utilities of the exemplary embodiments of the present general inventive concept will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
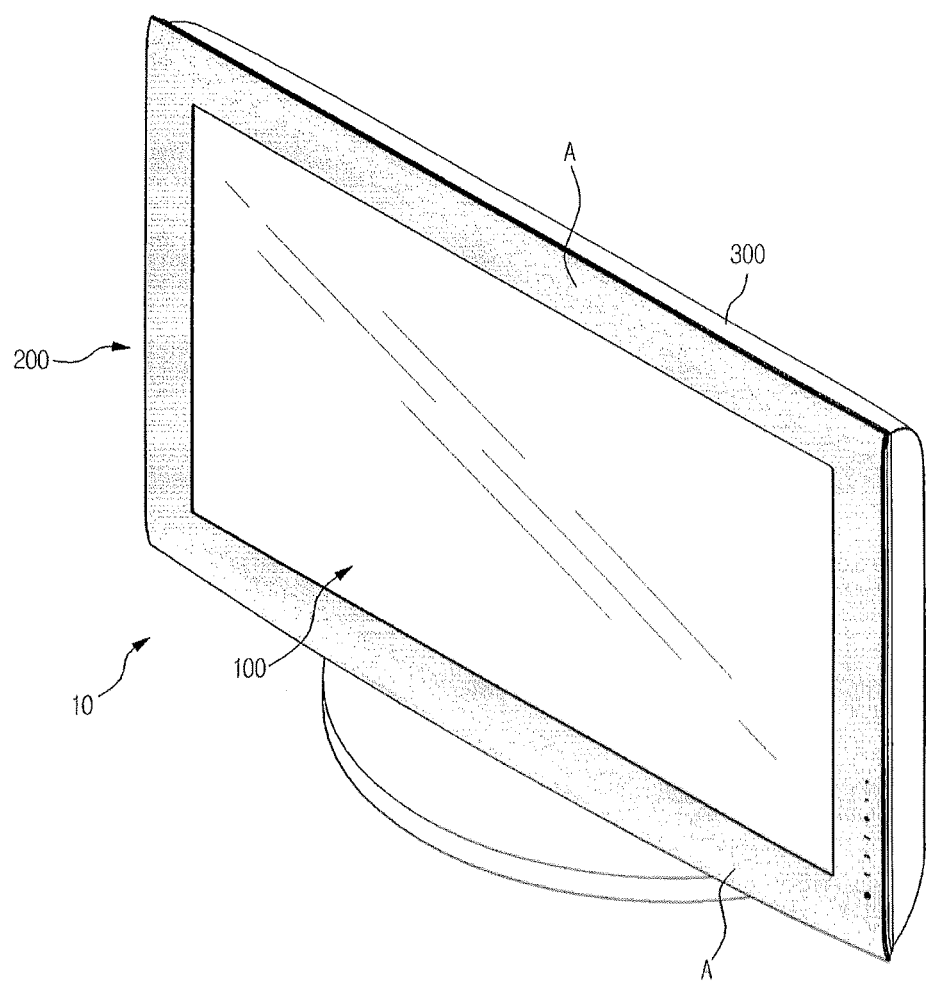
FIG. 1 is a perspective view illustrating an exterior appearance of a display according to a first exemplary embodiment of the present general inventive concept.

Reference will now be made in detail to exemplary embodiments of the present general inventive concept, examples of which are illustrated in the accompanying drawings, wherein like reference numerals refer to like elements throughout. The exemplary embodiments are described below to illustrate exemplary embodiments of the present general inventive concept by referring to the figures. FIG. 1 is a perspective view illustrating an exterior appearance of a display according to an exemplary embodiment of the present general inventive concept, FIG. 2 is an exploded perspective of the display illustrated in FIG. 1, separately illustrating a front cover, a display module and a rear cover, and FIG. 3 is a sectional view of FIG. 2 cut along a line I-I.

Figure 2:
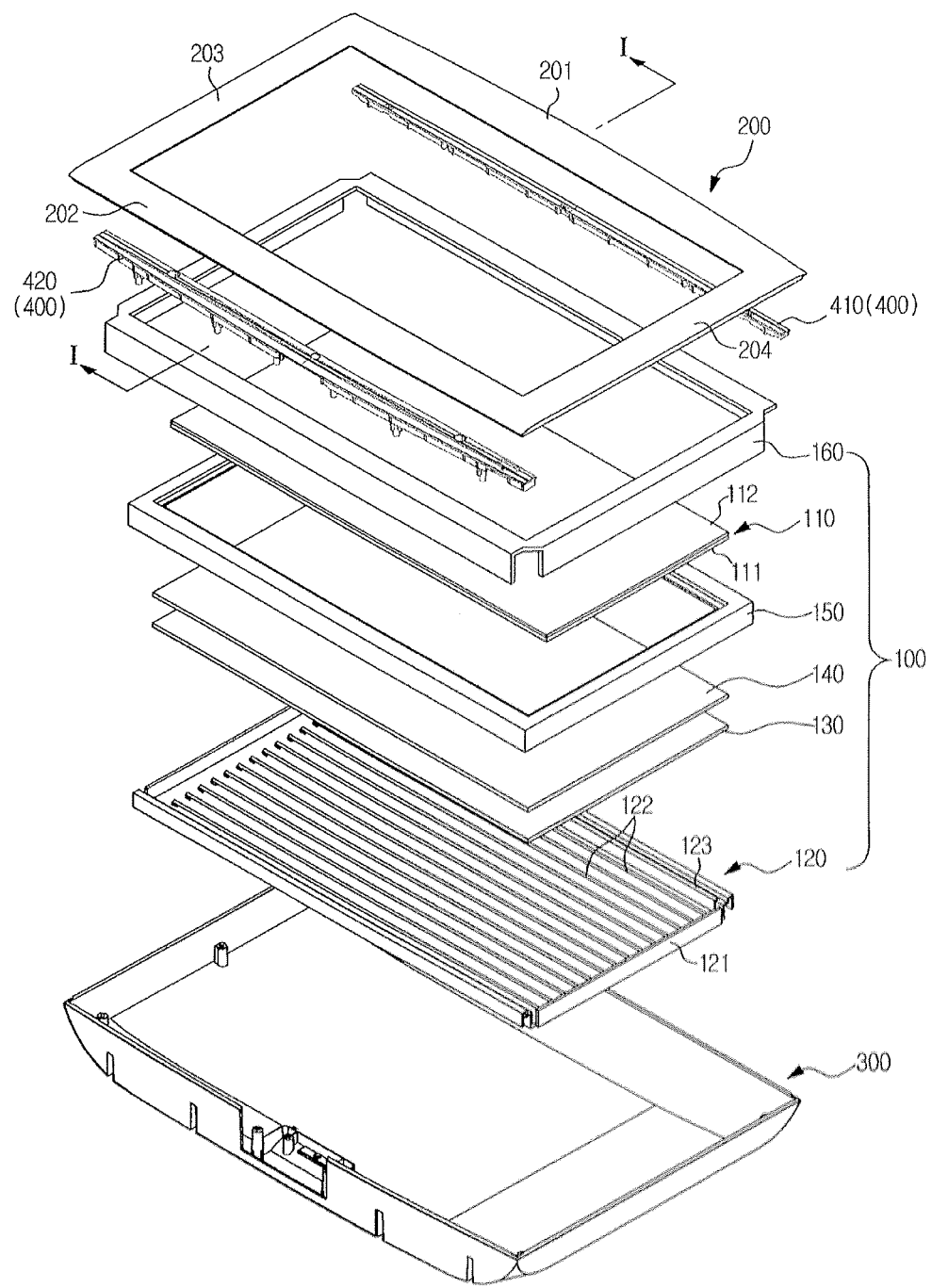
FIG. 2 is an exploded perspective of the display illustrated in FIG. 1, separately illustrating a front cover, a display module, and a rear cover.
Figure 3:
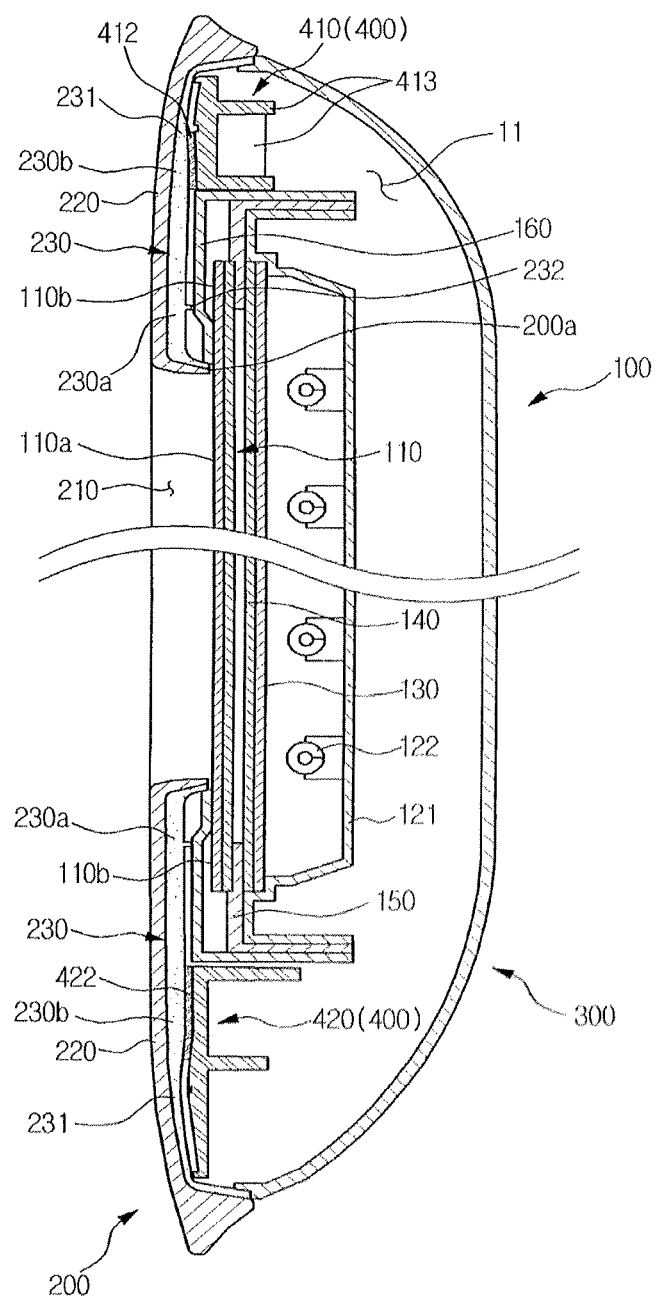
FIG. 3 is a sectional view of FIG. 2 cut along a line I-I.

As illustrated in FIG. 1 to FIG. 3, a display 10 includes a display module 100 to implement an image therethrough, a front cover 200 disposed on a front of the display module 100, and a rear cover 300 to cover a rear side of the display module 100.

The front cover 200 defines a receiving space 11 through a connection with the rear cover 300. Various portions including the display module 100 are mounted in the receiving space 11.

More specifically, since the exemplary embodiment illustrated in FIG. 1 is illustrated using an LCD display, the display module 100 includes a display panel 110 to display an image using liquid crystal, and a backlight assembly 120 to radiate light to the display panel 110.

The display panel 110 includes a thin film transistor (TFT) substrate 111, a color filter substrate 112 facing the TFT substrate 111, and a liquid crystal layer (not illustrated) injected between the TFT substrate 111 and the color filter substrate 112. The display panel 110 displays the image by adjusting transmittance of the light being radiated from the backlight assembly 120.

The display panel 110 includes an effective surface 110a on which the image is actually displayed, and a circumferential surface 110b disposed along an outline of the effective surface 110a.

The backlight assembly 120 includes a bottom chassis 121, lamps 122 arranged in the bottom chassis 121, and a reflection plate board 123 to reflect the light radiating from the lamps 122 toward the display panel 110.

Additionally, optical sheets are disposed between the display panel 110 and the backlight assembly 120 to improve optical properties of the light radiating from the backlight assembly 120. The optical sheets may include a diffusion plate 130 and a condensing sheet 140. The diffusion plate 130 improves luminance uniformity by diffusing the light radiated from the backlight assembly 120. The condensing sheet 140 arranges direction of light so that the light diffused by the diffusion plate 130 can be incident vertically to the display panel 110.

Furthermore, a middle mold 150 is interposed between the display panel 110 and the backlight assembly 120. The optical sheets 130 and 140 are supported between the middle mold 150 and the bottom chassis 121. A top chassis 160 is disposed in front of the display panel 110 while the display panel 110 is supported between the top chassis 160 and the middle mold 150.

The front cover 200, being disposed in front of the top chassis 160, constitutes a front exterior appearance of the display 10. More specifically, the front cover 200 has a form of a substantial square frame to cover the front periphery of the display module 100. The effective surface 110a of the display panel 110 is exposed to the outside through an opening 210 formed at the front cover 200.

Referring to FIG. 3, the front cover 200 includes a transparent layer 220 and a translucent layer 230 having a predetermined color. The transparent layer 220 forms an outer surface of the front cover 200 whereas the translucent layer 230 forms an inner surface of the front 200 as disposed behind the transparent layer 220.

The transparent layer 220 and the translucent layer 230 may be formed integrally with each other. Further, the transparent layer 220 and the translucent layer 230 may be formed integrally with each other by double injection molding. Here, the double injection molding of the transparent layer 220 and the translucent layer 230 can be performed in order of convenience. That is, the translucent layer 230 can be injection molded secondly after the transparent layer 220 is first injection molded or alternatively, the transparent layer 220 can be injection molded secondly after the translucent layer 230 is first formed by injection molding.

The transparent layer 220 and the translucent layer 230 may be formed of plastic including Polycarbonate (PC), Polymethyl Methacrylate (PMMA), and Acrylonitrile-Butadiene-Styrene (ABS).

More particularly, the translucent layer 230 may include a thickness variation portion 231 which has varied thickness and a different optical transmittance from the translucent layer 230.

Since the transmittance is lower at a relatively thicker portion in the translucent layer 230, a color of the translucent layer 230 looks darker at the thicker portion. Alternatively, a relatively thinner portion of the translucent layer 230 looks brighter since the relatively thinner portion has a higher transmittance. Accordingly, variable types of tone variation can be expressed through the front cover 200 by properly designing a direction and a degree of variation of the thickness in the thickness variation portion 231. Therefore, the thickness variation portion 231 can be referred to as a light transmitting varying portion.

For example, as illustrated in FIG. 3, when the thickness variation portion 231 is formed to become thinner toward the outside of the front cover 200, the color will become brighter toward the outside of the front cover 200. FIG. 1 schematically illustrates such a tone gradation at a portion A of the front cover 200.

However, differently from FIG. 3, the thickness variation portion 231 may be formed to become thinner toward the inside of the front cover 200. In this case, a tone gradation in which the color of the front cover 200 becomes brighter toward the inside can be implemented.

By forming a steep thickness change in the thickness variation portion 231, a desired portion can be emphasized especially bright. Also, by forming a gradual thickness change, a natural tone variation can be achieved on the front cover 200.

The translucent layer 230 further includes a first translucent layer 230a disposed at a front of the display module 100, and a second translucent layer 230b extended from the first translucent layer 230a toward the outside of the display panel 110. The thickness variation portion 231 may be formed at the second translucent layer 230b.

In this case, a portion of the front cover 200, corresponding to the first translucent layer 230a, looks nearly black because the light is intercepted by the display module 100 disposed behind the front cover 200. Alternatively, a portion of the front cover 200, corresponding to the second translucent layer 230b, is able to express a natural variation of the color of the translucent layer 230. For example, when the translucent layer 230 has a wine color, the tone variation from near black to bright wine can be achieved on the front cover 200.

As illustrated in FIG. 3, the thickness variation portion 231 may be disposed in the receiving space 11 formed by the front cover 200 and the rear cover 300. Since the inside of the receiving space is dark, the tone variation of the thickness variation portion 231 would not be favorably expressed. For this reason, at least one reflection member 400 may be provided to reflect the light radiated into the receiving space 11 toward the thickness variation portion 231, at a rear portion of the thickness variation portion 231.

The reflection member 400 reflects the light radiated into the receiving space 11 from the outside of the display 10, for example an interior place, toward the thickness variation portion 231 so that the tone variation by the thickness variation portion 231 can be noticeably seen by the user. For this purpose, the reflection member 400, for example, has a high-brightness color such as white.

Figure 4:
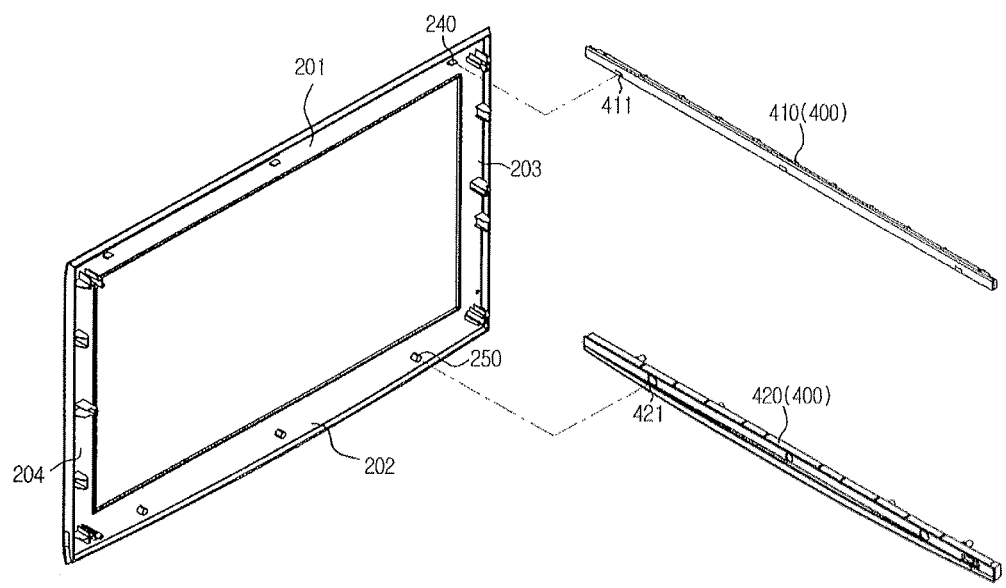
FIG. 4 is a perspective view illustrating the front cover and a reflection member of the display according to the exemplary embodiment illustrated in FIG. 1.

FIG. 4 is a perspective view illustrating the front cover 200 and the reflection member 400 of the display 10 according to the exemplary embodiment illustrated in FIG. 1.

As illustrated in FIG. 1, FIG. 3 and FIG. 4, the front cover 200 may include an upper portion 201, a lower portion 202, a left portion 203 and a right portion 204 respectively covering upper, lower, left and right sides of the display module 100.

The at least one reflection member 400 is mounted corresponding to at least one of the upper portion 201, the lower portion 202, the left portion 203 and the right portion 204. In this exemplary embodiment, a first reflection member 410 and a second reflection member 420 are formed corresponding to the upper portion 201 and the lower portion 202 of the front cover 200, respectively. However, the present general inventive concept is not limited to this configuration. The number of the reflection member 400 can be varied as necessary.

The first reflection member 410 is mounted on a rear surface of the thickness variation portion 231, corresponding to the upper portion 201 of the front cover 200. The front cover 200 includes positioning protrusions 240 protruded backward from the upper portion 201. The first reflection member 410 includes positioning holes 411 corresponding to the positioning protrusions 240. A transparent double-sided tape 412 (FIG. 3) is attached to a front surface 410a of the first reflection member 410 and in this state, the positioning holes 411 of the first reflection member 410 are fitted to the positioning protrusions 240. Then, by being pressed toward the front cover 200, the first reflection member 410 can be attached to the front cover 200.

Additionally, the first reflection member 410 may include a reinforcing rib 413 protruded on a rear surface thereof. The reinforcing rib 413 enhances stiffness of the first reflection member 410, thereby preventing bending of the first reflection member 410.

The second reflection member 420 is mounted to the rear surface of the thickness variation portion 231, corresponding to the lower portion 202 of the front cover 200. The second reflection member 420 may be attached to the front cover 200 using a transparent double-sided tape 422. In the same manner as the first reflection member 410, the second reflection member 420 includes positioning holes 421 whereas the lower portion 202 of the front cover 200 includes positioning protrusions 250 corresponding to the positioning holes 421.

As illustrated in FIG. 3, the first translucent layer 230a of the translucent layer 230 may include a supporting protrusion 232 protruding toward the periphery of the display module 100 in order to support the front cover 200 against the top chassis 160 of the display module 100 in case that an external force is exerted onto the front cover 200 for any reason. This is to prevent damage of the effective surface 110a of the display panel 110 that may be caused when the effective surface 110a is pressed by an inner end 200a of the front cover 200 due to the external force exerted to the front cover 200. Instead of forming the supporting protrusion 232 at the translucent layer 230, another material such as sponge may be dedicatedly attached to the rear surface of the translucent layer 230.

Although the translucent layer 230 is disposed behind the transparent layer 220 in the exemplary embodiment illustrated in FIG. 3, the translucent layer 230 may be disposed in front of the transparent layer 220.

Figure 5:
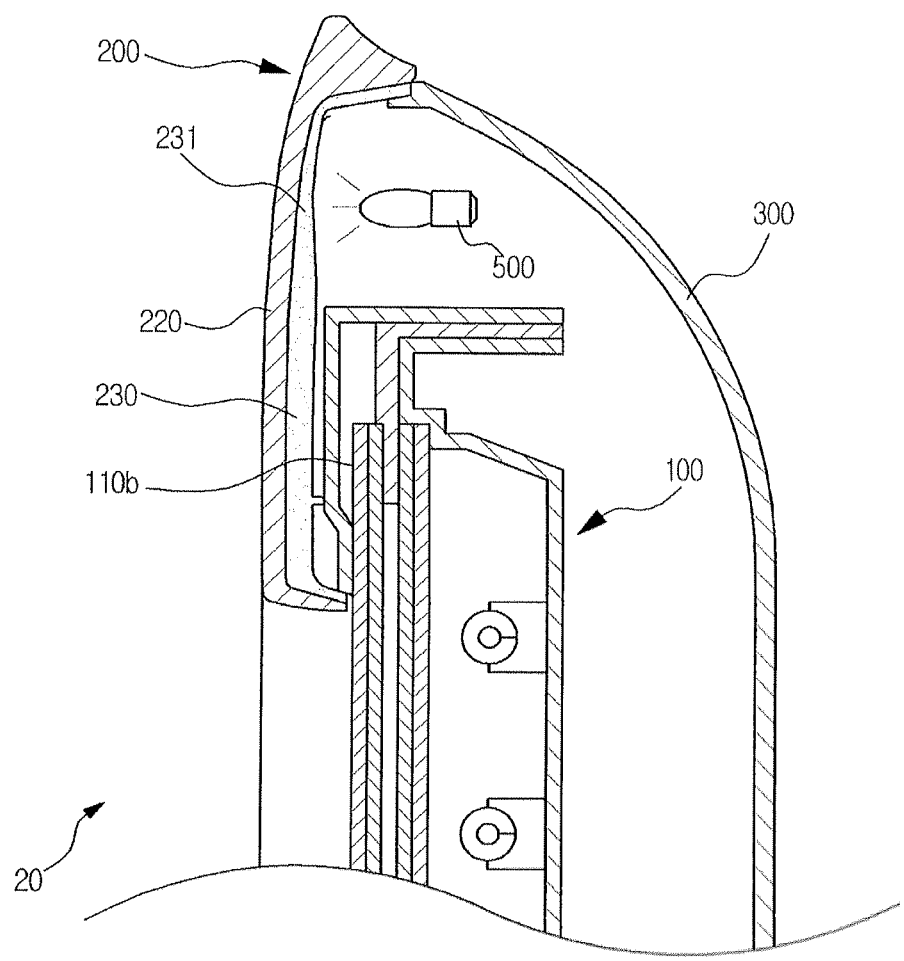
FIG. 5 is a view illustrating a structure of a display according to an exemplary embodiment of the present general inventive concept.

FIG. 5 illustrates a structure of the display according to an exemplary embodiment of the present general inventive concept. Hereinafter, only distinctive features of this exemplary embodiment will be described, omitting the features in common with the exemplary embodiment of FIG. 3.

As illustrated in FIG. 5, a display 20 according to the present exemplary embodiment may include a light source 500 which is mounted to the rear portion of the thickness variation portion 231 of the front cover 200. That is, the present exemplary embodiment is distinctive in terms of the light source 500 provided instead of the reflection member 400 of the previous exemplary embodiment.

Using the light source 500, the tone variation can be more effectively illustrated through the front cover 200 even in a dark interior place.

Various types of lamps may be applied for the light source 500. However, if the light source 500 has an excessive luminosity, the tone variation embodied by the thickness variation portion 231 may not be favorably expressed. Therefore, the type and the luminosity of the light source 500 need to be determined in consideration of the color of the translucent layer 230 and the thickness of the thickness variation portion 231, such that the color of the front cover 200 can be mildly expressed.

Figure 6:
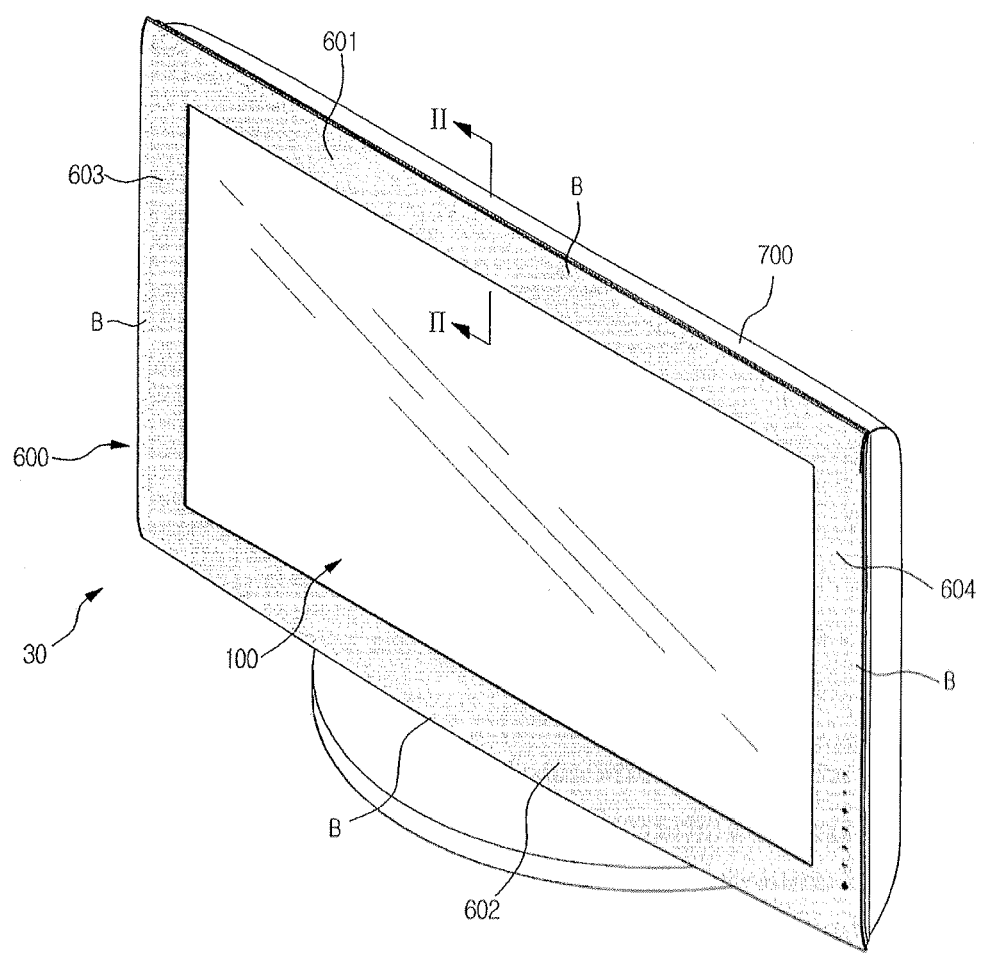
FIG. 6 is a perspective view illustrating an exterior appearance of a display according to an exemplary embodiment of the present general inventive concept.
Figure 7:
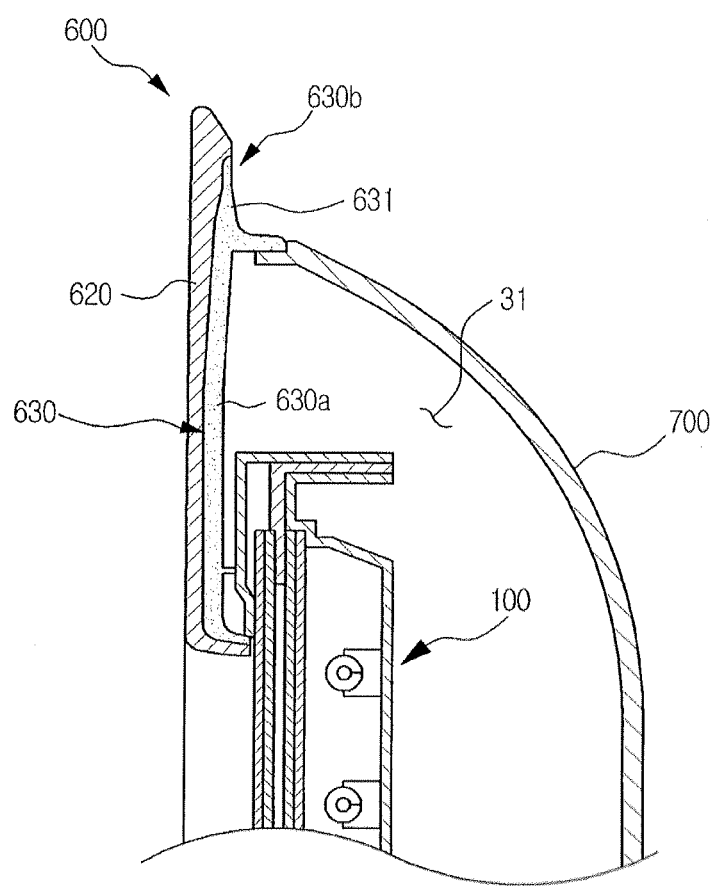
FIG. 7 is a sectional view of FIG. 6 cut along a line II-II.

FIG. 6 is a perspective view illustrating an exterior appearance of a display according to a third exemplary embodiment of the present general inventive concept and FIG. 7 is a sectional view of FIG. 6 cut along a line II-II.

As illustrated in FIGS. 6 and 7, a display 30 includes a front cover 600, and a rear cover 700 which forms a receiving space 31 through connection with the front cover 600. The display module 100 is mounted in the receiving space 31. The display module 100 has substantially the same structure as explained with respect to FIG. 3.

The front cover 600 includes a transparent layer 620 and a translucent layer 630 having a predetermined color. The transparent layer 620 and the translucent layer 630 can be formed integrally with each other by double injection molding.

The translucent layer 630 includes a first translucent portion 630a disposed in the receiving space 31, and a second translucent portion 630b extended toward the outside of the receiving space 31. The second translucent portion 630b of the translucent layer 630 includes a thickness variation portion 631 having varied thickness.

According to the present exemplary embodiment, by thus disposing the thickness variation portion 631 out of the receiving space 31, the tone variation can be expressed on the front cover 600 without requiring a dedicated reflection member or light source.

Since the inside of the receiving space 31 is dark, the first translucent portion 630a of the translucent layer 630 disposed at a front of the receiving space 31 looks nearly black as seen from the outside. Alternatively, the thickness variation portion 631 exposed out of the receiving space, that is, to the interior place transmits the light of the interior place. Accordingly, the natural tone variation regarding the color of the translucent layer 630 can be implemented through the second translucent portion 630b.

FIG. 7 merely illustrates a sectional surface of an upper portion 601 of the front cover 600. However, the thickness variation portion 631 may be formed also at a lower portion 602, a left portion 603, and a right portion 604 in the similar manner. The tone variation of the front cover 600 is schematically illustrated by a portion B in FIG. 6.

Figure 8:
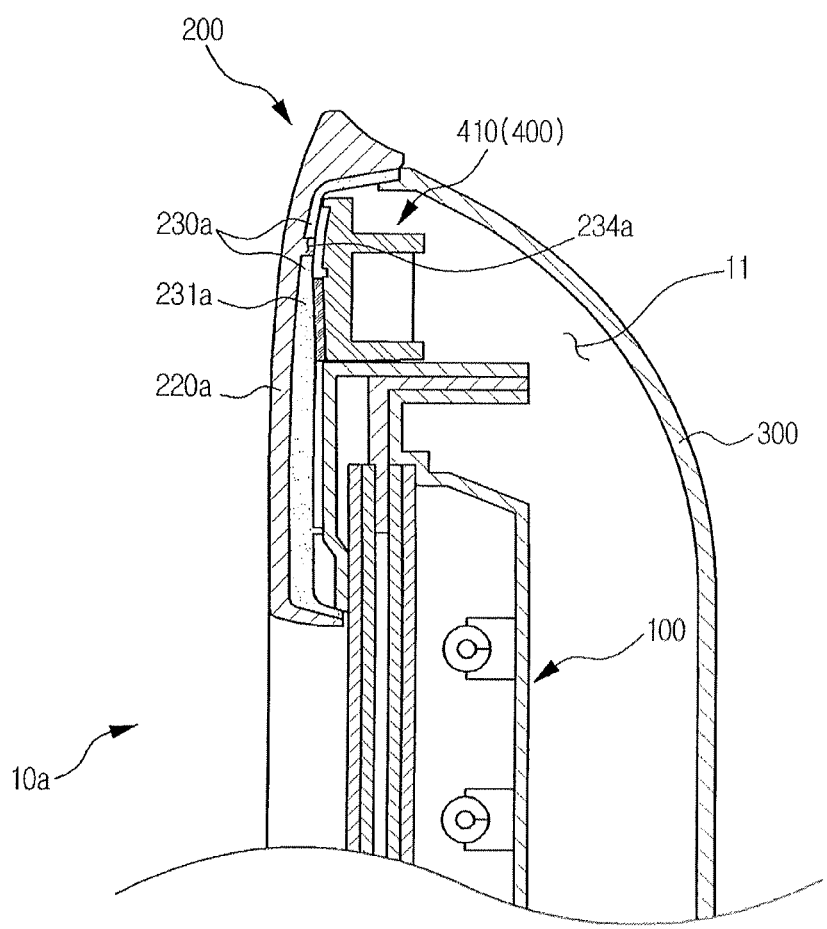
FIG. 8 is a sectional view of a display according to an exemplary embodiment of the present general inventive concept.

FIG. 8 is a sectional view of a display according to an exemplary embodiment of the present general inventive concept. Only distinctive features from the exemplary embodiment illustrated in FIG. 1 will now be described. For concise explanation, the same elements as in the exemplary embodiment illustrated in FIG. 1 will be cited by the same reference numerals while altered or modified elements will be cited by reference numerals added with 'a' to the previous ones.

As illustrated in FIG. 8, the display 10a according to the present exemplary embodiment includes the front cover 200, and the rear cover 300 defining the receiving space 11 through connection with the front cover 200.

The front cover 200 includes a transparent layer 220a and a translucent layer 230a having a predetermined color. The transparent layer 220a constitutes an outer surface of the front cover 200 whereas the translucent layer 230a forms an inner surface of the front cover 200 as disposed behind the transparent layer 220a.

The transparent layer 220a and the translucent layer 230a may be integrally formed through double injection molding. The order of the double injection molding may be varied depending on the manufacturing process. Tone variation implemented by the translucent layer 230a and the reflection member 400 disposed behind the transparent layer 220a is illustrated through the front cover 200, accordingly improving aesthetic beauty.

The translucent layer 230a includes a thickness variation portion 231a having varied thickness. Since the transmittance is lower at a relatively thicker portion in the translucent layer 230, the color of the translucent layer 230 looks darker at the thicker portion. Alternatively, a relatively thinner portion of the translucent layer 230 looks brighter since it has a higher transmittance. The thickness variation portion 231a has a penetrated portion 234a.

The penetrated portion 234a denotes a section in which the translucent layer 230a is absent in a cross-sectional direction of the translucent layer 230a. Therefore, the transmittance becomes abruptly high at the penetrated portion 234a and as a result, the color can be illustrated more clearly at a portion of the front cover 200 corresponding to the penetrated portion 234a. In this exemplary embodiment, although the penetrated portion 234a is implemented as a hole formed on a portion of the translucent layer 230a for convenient explanation, the penetrated portion 234a may have a certain shape occupying a great portion of the translucent layer 230a. In this case, the tone variation radiated by the reflection member 400 can be illustrated more clearly through the front cover 200 according to the shape of the penetrated portion 234a.

Figure 9:
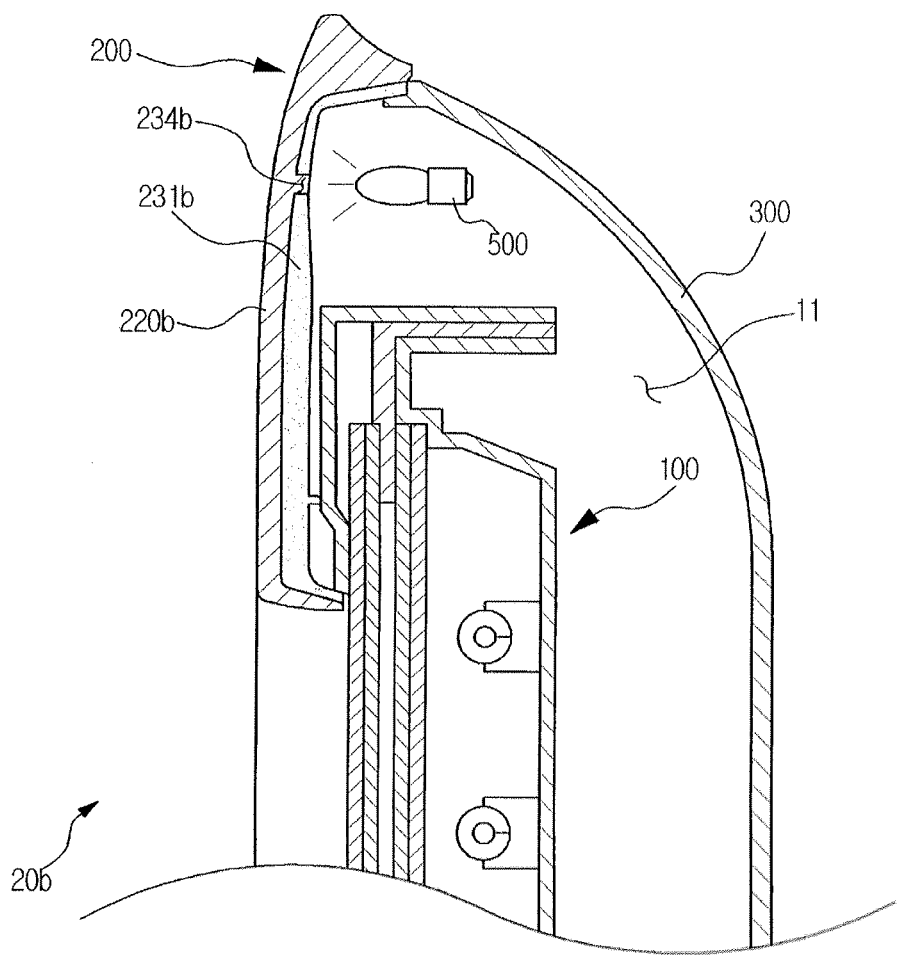
FIG. 9 is a sectional view of a display according to an exemplary embodiment of the present general inventive concept.

FIG. 9 is a sectional view of a display according to an exemplary embodiment of the present general inventive concept. Only distinctive features from the exemplary embodiment illustrated in FIG. 5 will be described hereinafter while the same elements as in the exemplary embodiment illustrated in FIG. 5 will be cited by the same reference numerals. Altered or modified elements will be cited by reference numerals added with 'b' to the previous ones.

As illustrated in FIG. 9, the display 20b according to the present exemplary embodiment includes the front cover 200 having a penetrated portion 234b and a transparent layer 220b, the rear cover 300 defining the receiving space 11 through connection with the front cover 200, and the light source 500 formed in the receiving space 11.

Using the light source 500, the tone variation can be more effectively expressed on the front cover 200 even in a dark interior place. Light radiated from the light source 500 penetrates a thickness variation portion 231b formed at a translucent layer 230b and is illustrated on the front cover 200. When the penetrated portion 234b is formed at a portion of the thickness variation portion 231b, the light from the light source 500 will be more clearly illustrated on the front cover 200. Although the penetrated portion 234b is implemented in the form of a hole in this exemplary embodiment, it will be surely understood that the penetrated portion 234b may have any certain shape occupying a great portion of the translucent layer 230a as explained with the exemplary embodiment illustrated in FIG. 8.

Figure 10:
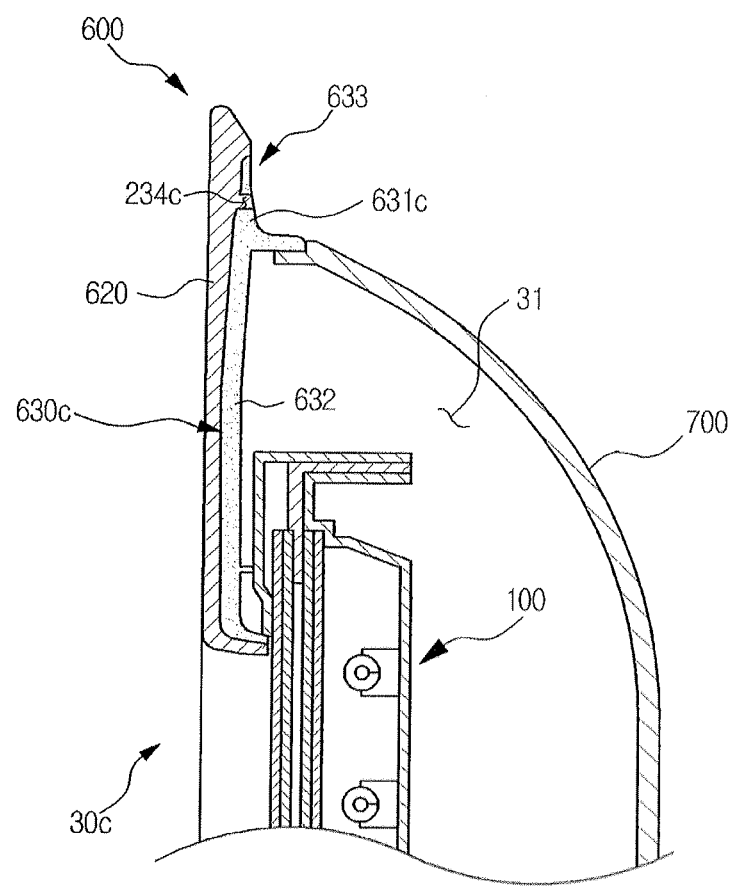
FIG. 10 is a sectional view of a display according to an exemplary embodiment of the present general inventive concept.

FIG. 10 is a sectional view of a display according to an exemplary embodiment of the present general inventive concept. Only distinctive features from the exemplary embodiment illustrated in FIG. 6 will be described hereinafter while the same elements as in the exemplary embodiment illustrated in FIG. 6 will be cited by the same reference numerals. Altered or modified elements will be cited by reference numerals added with 'c' to the previous ones.

As illustrated in FIG. 10, the display 30c according to the present exemplary embodiment includes a front cover 600 including a transparent layer 620 and a translucent layer 630c, and a rear cover 700 defining a receiving space 31 through connection with the front cover 600.

The translucent layer 630c includes a first translucent layer 632 disposed in the receiving space 31 and a second translucent layer 633 extended toward the outside of the receiving space 31. Whereas the first translucent layer 632 disposed inside the receiving space 31 is expressed dark on the front cover 600, the second translucent layer 633 exposed to the outside is capable of transmitting the light of the interior place and accordingly expressing the difference of luminosity by the natural light of through the front cover 600. In addition, the second translucent layer 633 includes a thickness variation portion 631c so that the tone illustrated through the front cover 600 can be variably expressed in accordance with the color of the translucent layer 630.

A penetrated portion 234c is formed at the second translucent layer 633. The tone variation being naturally expressed through the thickness variation portion 631c becomes abrupt at the portion corresponding to the penetrated portion 234c. Therefore, the shape of the penetrated portion 234c can be more clearly illustrated on the front cover 600.

Figure 11:
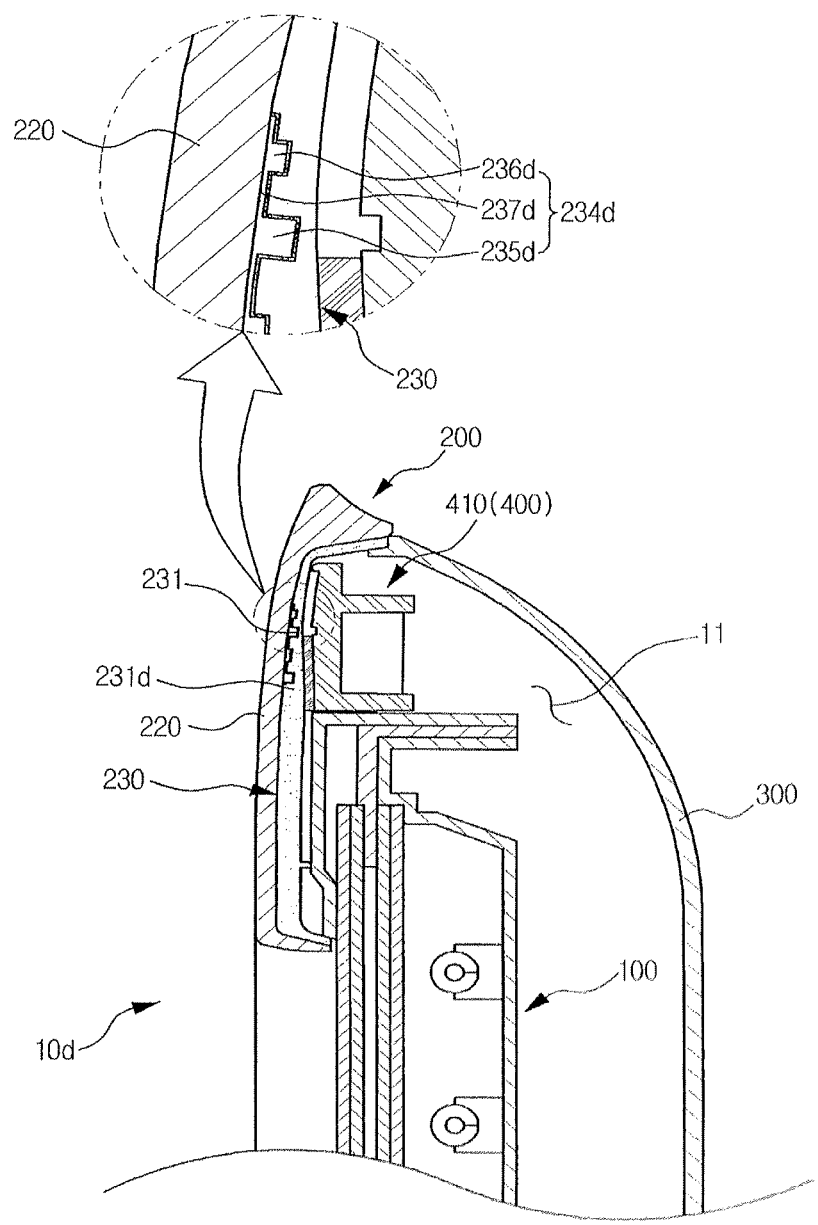
FIG. 11 is a sectional view of a display according to an exemplary embodiment of the present general inventive concept.
Figure 12:
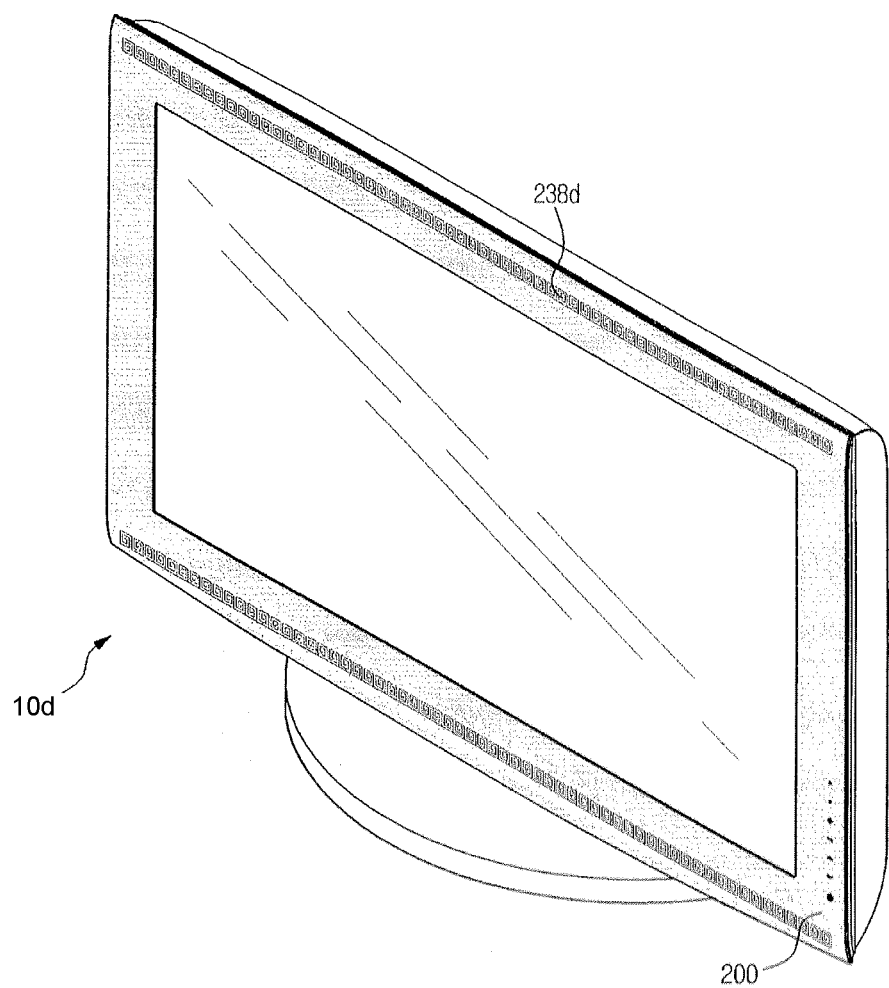
FIG. 12 is a perspective view of the display of FIG. 11.

FIG. 11 is a sectional view of a display 10d according to an exemplary embodiment of the present general inventive concept. FIG. 12 is a perspective view of the display 10d of FIG. 11. Only distinctive features from the exemplary embodiment of FIG. 1 will be described hereinafter while the same elements as in the exemplary embodiment illustrated in FIG. 1 will be cited by the same reference numerals. Altered or modified elements will be cited by reference numerals added with 'd' to the previous ones.

As illustrated in the drawings, the display 10d according to the present exemplary embodiment includes the front cover 200 including the transparent layer 220 and the translucent layer 230, and the rear cover 300 defining the receiving space 11 through connection with the front cover 200.

The translucent layer 230 includes a thickness variation portion 231d and the thickness variation portion 231d has a plurality of uneven portions 234d.

The uneven portions 234d are formed on a surface of the translucent layer 230 contacting the transparent layer 220. The light radiated from the reflection member 400 to the front cover 200 implements the tone variation as passing through the thickness variation portion 231d. When the light reaches the uneven portions 234d, the tone is abruptly varied and therefore patterns of the uneven portion 234d can be prominently illustrated through the front cover 200. More specifically, the uneven portion 234d may include deep, medium and shallow uneven portions 235d, 236d and 237d according to respectively different depths thereof. The deep uneven portion 235d allows more light to be transmitted through the front cover 200 than the shallow uneven portion 237d. Therefore, more various patterns 238d formed by the uneven portion 234d can be achieved by properly arranging the deep, medium and shallow uneven portions 235d, 236d and 237d. The translucent layer 230 including the uneven portion 234d may be made of plastic materials including PC, PMMA and ABS having a single color. In case that the translucent layer 230 is made of a plastic material having two or more colors, the patterns 238d can also be variably expressed through the front cover 200 in two or more colors.

Figure 13A:
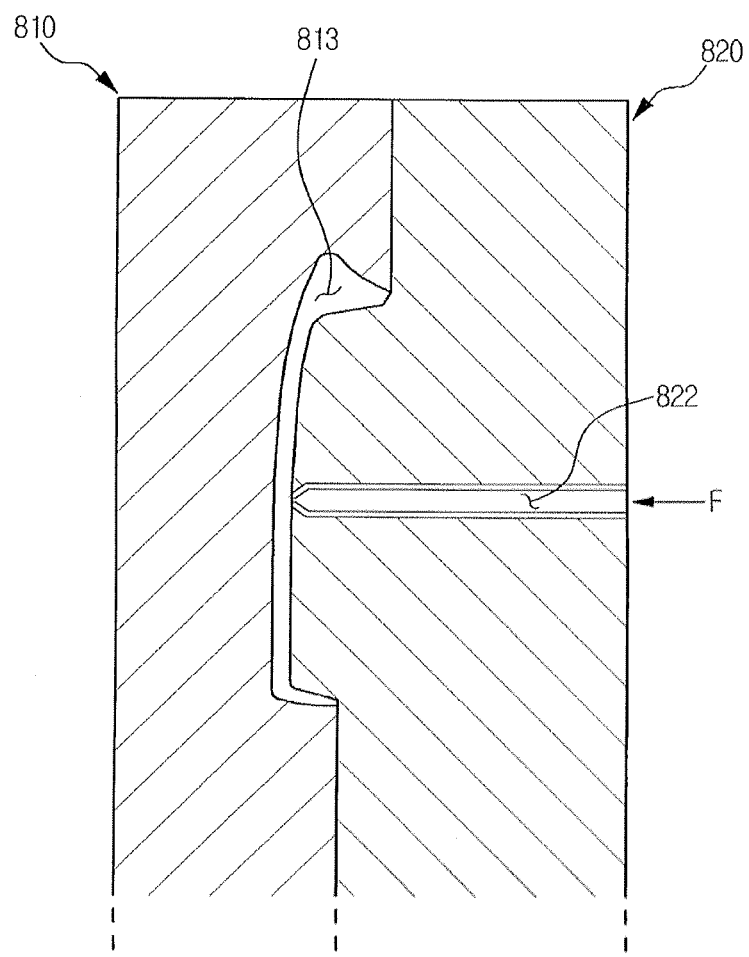
FIG. 13A through FIG. 13C are views illustrating first and second injection molding processes of the first and second molded materials.
Figure 13B:
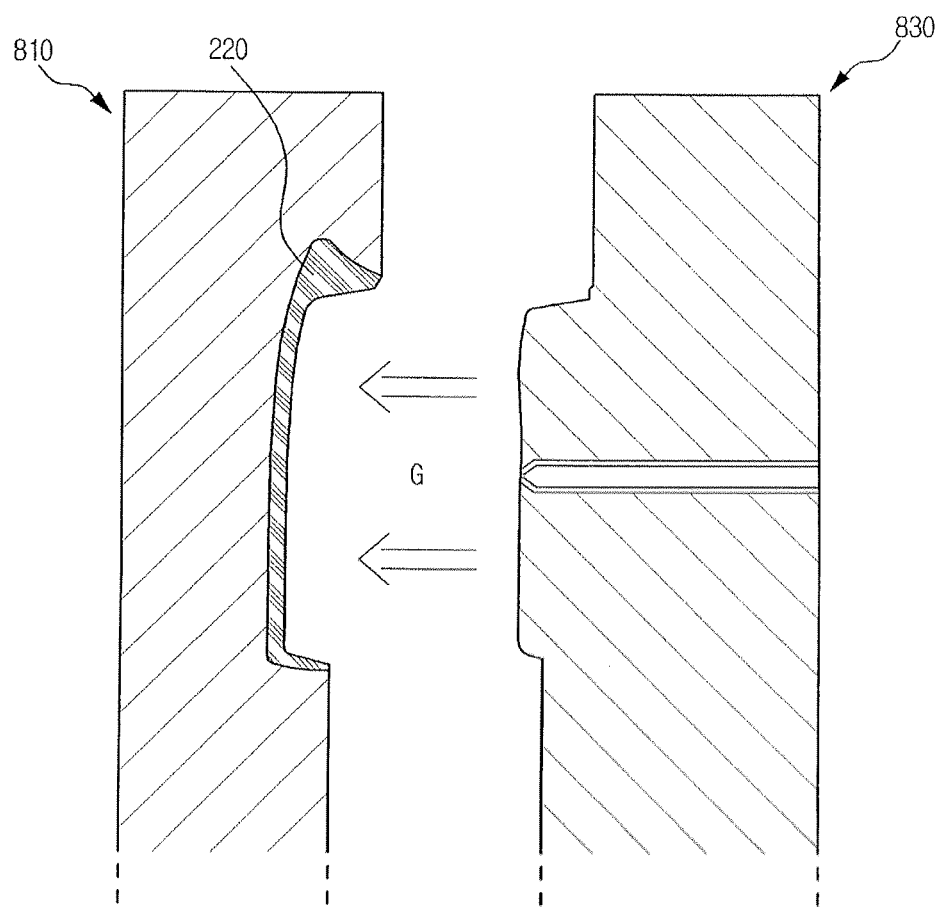
Figure 13C:
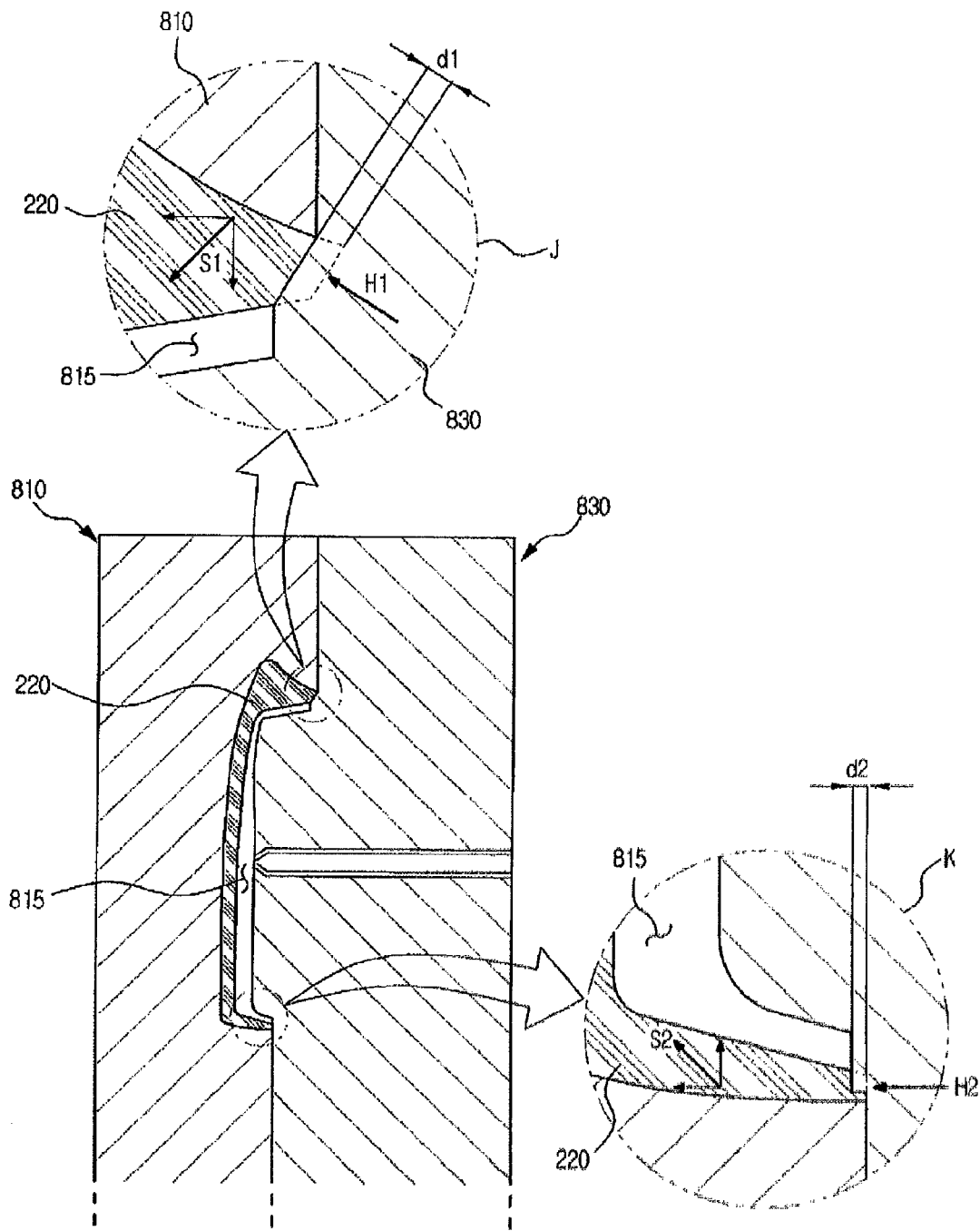

FIG. 13A through FIG. 13C show first and second injection molding processes of first and second molded materials. As illustrated in the drawings, the front cover 200 is manufactured by injection molding the transparent layer 220 first and then the translucent layer 230 (FIG. 3) second.

More specifically, as illustrated in FIG. 13A, a first mold 820 is brought into close contact with a base mold 810 in order to mold the transparent layer 220 (FIG. 13B) corresponding to a shape of a first injection molding portion 813. The first molding portion 813 is a space formed by contact between the base mold 810 and the first mold 820 in a shape corresponding to the transparent layer 220. The first mold 820 has a first injection hole 822 formed in a direction of first injection molding F to inject a first molded material in the first molding portion 813 therethrough. Thus, the transparent layer 220 is formed by injecting the first molded material in the first molding portion 813 through the first injection hole 822.

FIG. 13B illustrates a process of connecting a second mold 830 which is a sealing mold, after the first injection molding of the transparent layer 220. The first mold 820 (FIG. 13A) is removed after the first injection molding and the second mold 830 is brought in a connection direction G. Here, the transparent layer 220 which is the first molded material remains in the base mold 810 as a result of the first injection molding.

Referring to FIG. 13C, the second mold 830 which is the sealing mold is connected with the base mold 810. First and second border portions J and K between the transparent layer 220, which is the first molded material, and the translucent layer 230 (FIG. 3) are transformed by compression.

More particularly, the first and second border portions J and K refer to contacting portions between an edge of the second injection molding portion 815 and the transparent layer 220 which is the first molded material. If the border portions J and K are not securely sealed, the second molded material will leak through gaps of the first and second border portions J and K when injecting the second molded material in the second molding portion 815, thereby deteriorating quality of the product.

At the first border portion J, the second mold 830 is connected to the base mold 810, thereby compressing the first molded transparent layer 220 by as much as a first predicted compression degree d1. The first compression degree d1 is determined in consideration of a degree of shrinkage of the transparent layer 220, the shrinkage generated while the high-temperature first molded material is cooled to a normal temperature. Specifically, the first compression degree d1 is a distance in a range of about 0.05 mm to 0.2 mm. Since the second mold 830 is closely connected while compressing the transparent layer 220 by the first compression degree d1 in preparation for shrinkage of the transparent layer 220, although the transparent layer 220 is shrunk later during the second injection molding, the second molded material would not leak through the first border portion J. Meanwhile, since the shrinkage at the first border portion J occurs as slanted with respect to the transparent layer 220, the sealing can be performed to cope with both vertical and horizontal shrinkages of the transparent layer 220. More specifically, at the first border portion J, the transparent layer 220 is apt to shrink in a first shrinking direction S considering horizontal and vertical shrinkage degrees. Therefore, when compressing the transparent layer 220 in a first compressing direction H which is substantially vertical to the first shrinking direction S1, compression at the first border portion J can be minimized, while preventing leakage of the second molded material through the first border portion J.

At the second border portion K as well, the second mold 830 is connected while compressing the transparent layer 220 which is first molded, by as much as a second compression degree d2. At the second border portion K, the compression is generated only around the border between the transparent layer 220 and the second molding portion 815 by the second compression degree d2. With such a shape of the second border portion K, the sealing effect can be achieved as desired through minimum compression of the transparent layer 220. More specifically, the transparent layer 220 at the second border portion K is apt to shrink in a second shrinking direction S2 considering the horizontal and vertical shrinkage degrees. Accordingly, when the transparent layer 220 is compressed just partly in a second compressing direction H which is at approximately 45 degrees with the second shrinking direction S2, the compression can be minimized. In addition, since a non-compressed portion closely contacts the second mold 830, leakage of the second molded material can be prevented.

While the above exemplary embodiments and manufacturing processes have been described with the transparent layer being in front of the translucent layer, those skilled in the art would recognize that the ordering of the transparent layer and the translucent layer can be reversed.

According to an exemplary embodiment described above, a display improved in an exterior appearance may be achieved by a front cover covering a display panel, the front cover including a translucent layer which transmits colored light, and a transparent layer to receive and transmit the colored light, wherein the translucent layer and the transparent layer are integrally formed.

Further, according to various exemplary embodiments described above, a natural tone variation can be implemented through a thickness variation portion formed at a front cover, thereby improving an exterior appearance of a display.

According to another exemplary embodiment, the variation portion in the translucent layer is not required to be consistent with the present general inventive concept of achieving a display improved in an exterior appearance. Specifically, the front cover may be formed such that the translucent layer and the transparent layer are simply integrally formed.

Additionally, in order to achieve a tone variation, a variation portion may be added to the integrally formed front cover. For example, in order to achieve a tone variation, the variation portion may include an additional material (e.g., translucent film, paint, etc.) which may be disposed between the translucent layer and the display, or the variation portion may be disposed between the transparent layer and the display.

Alternatively, the translucent layer may include a first and a second portion such that, in order to achieve a tone variation, a color of a first portion of the translucent layer may be different from a color of the second portion so that a tone variation occurs between the first and the second portions of the translucent layer. For example, the color of the first portion may have a different translucence than the second portion. Accordingly, a tone variation could be achieved due to the differences in the colored light transmitted through the translucent layer between the first and second portions.

Additionally, the transparent layer may include at least one penetrated portion so that the at least one of the translucent layer and the transparent layer is formed discontinuously. Furthermore the front cover may an upper portion, a lower portion, a left portion and a right portion, wherein the at least one penetrated portion is formed in at least one of the upper, lower, left and right portions. On the other hand, at least one of the translucent layer and the transparent layer may include at least one uneven portion, and the front cover may include that upper portion, the lower portion, the left portion and the right portion, wherein the at least one uneven portion is formed in at least one of the upper, lower, left and right portions while forming a predetermined pattern. In this way, a tone variation could be achieved due to the differences in the colored light transmitted through the at least one penetrated portion or the predetermined pattern in at least one of the upper, lower, left and right portions.

Alternatively, as noted above, the front cover may include a variation portion which achieves a tone variation of the colored light, wherein the variation portion may include the at least one uneven portion. Similarly, the variation portion may further include an upper portion, a lower portion, a left portion and a right portion, wherein the at least one uneven portion is formed in at least one of the upper, lower, left and right portions while forming a predetermined pattern.

Since the structure to improve the exterior appearance of the front cover is manufactured integrally with the front cover, additional work can be prevented. As a result, the manufacturing process of the display can be simplified.

Furthermore, since various patterns can be implemented through the tone variation, the exterior appearance of the display can be improved.

Also, according to various exemplary embodiments of the present general inventive concept, while the front cover may be manufactured through first and second injection molding processes, leakage of a second molding material can be prevented.

Although various exemplary embodiments of the present general inventive concept have been illustrated and described, it would be appreciated by those skilled in the art that changes may be made in this exemplary embodiment without departing from the principles and spirit of the general inventive concept, the scope of which is defined in the claims and their equivalents.

What is claimed is:

1. A front cover including a front exterior of a display, the front cover comprising:
    a first molded material formed by first injection molding using a first injection mold and a second molded material formed by second injection molding using a sealing mold; and
    a variation portion to achieve a tone variation,
    wherein:

the first molded material includes a compressed portion compressed by the sealing mold, as a result of providing a sealing during the second injection molding the first molded material is a transparent layer, and the second molded material is a translucent layer having a predetermined color, the translucent layer includes a first portion and a second portion, and a color of the first portion of the translucent layer is different from a color of the second portion such that the tone variation occurs by differences of an optical transmittance between the first portion and the second portion of the translucent layer.

2. The front cover according to claim 1, wherein the compressed portion is compressed along a border with the second molded material molded on the first molded material.

3. The front cover according to claim 2, wherein compression of the compressed portion is corresponding to a degree of a shrinkage of the first molded material while the first molded material is cooled during the second injection molding.

4. A front cover usable with a display having a display module, the front cover comprising:
- a translucent layer including a first portion, a second portion and a variation portion, the variation portion having a varied thickness to achieve a tone variation; and
- a transparent layer proximate to the translucent layer to transmit the tone variation;

wherein
- the translucent layer and the transparent layer cover at least a portion of the front side of the display module, and
- a color of the first portion of the translucent layer is different from a color of the second portion such that the tone variation occurs by differences of an optical transmittance between the first portion and the second portion of the translucent layer.

5. The front cover according to claim 4, wherein the transparent layer transmits the tone variation by differences of an optical transmittance.

6. The front cover according to claim 4, wherein the transparent layer and the translucent layer surround the display module of the display.

7. A front cover usable with a display having a display module, the front cover comprising:
- a transparent layer to transmit light;
- a non-transparent layer to change a tone of light varying along a length of the transparent layer and to transmit the changed tone of the light toward the transparent layer, the non-transparent layer includes a first portion and a second portion; and
- a variation portion to achieve a tone variation wherein
- the non-transparent layer and the transparent layer cover at least a portion of the front side of the display module, and
- a color of the first portion of the non-transparent layer is different from a color of the second portion such that the tone variation occurs by differences of an optical transmittance between the first portion and the second portion of the non-transparent layer.

8. A front cover of a display panel, the front cover comprising:
- a translucent layer which transmits colored light;
- a transparent layer to receive and transmit the colored light, the translucent layer including a first portion and a second portion; and
- a variation portion to achieve a tone variation of the colored light, the variation portion being disposed between the transparent layer and the display panel, wherein:
- the translucent layer and the transparent layer cover at least a portion of the front side of the display panel,
- the translucent layer and the transparent layer are integrally formed, and
- a color of the first portion of the translucent layer is different from a color of the second portion such that the tone variation occurs by differences of an optical transmittance between the first portion and the second portion of the translucent layer.

9. The front cover according to claim 8, wherein the translucent layer is disposed behind the transparent layer, and the translucent layer is disposed in front of the display panel.

10. The front cover according to claim 8, wherein the variation portion is disposed between the translucent layer and the display panel.

11. The front cover according to claim 10, wherein the variation portion includes a translucent film.

12. The front cover according to claim 10, wherein the variation portion includes a layer of paint.

13. The front cover according to claim 8, wherein the variation portion includes a translucent film.

14. The front cover according to claim 8, wherein the variation portion includes a layer of paint.

15. The front cover according to claim 8, wherein at least one of the translucent layer and the transparent layer comprises:
- at least one penetrated portion so that the at least one of the translucent layer and the transparent layer is formed discontinuously.

16. The front cover according to claim 15, further comprising:
- an upper portion, a lower portion, a left portion and a right portion, wherein the at least one penetrated portion is formed in at least one of the upper portion, lower portion, left portion and right portion.

17. The front cover according to claim 8, wherein at least one of the translucent layer and the transparent layer comprises at least one uneven portion.

18. The front cover according to claim 17, further comprising:
- an upper portion, a lower portion, a left portion and a right portion, wherein the at least one uneven portion is formed in at least one of the upper portion, lower portion, left portion and right portion while forming a predetermined pattern.

19. The front cover according to claim 8, wherein the variation portion comprises at least one uneven portion.

20. The front cover according to claim 19, wherein the uneven portion is formed adjoining at least one of the transparent layer and the translucent layer.

21. The front cover according to claim 19, wherein the variation portion further comprises an upper portion, a lower portion, a left portion and a right portion, wherein the at least one uneven portion is formed in at least one of the upper portion, lower portion, left portion and right portion while forming a predetermined pattern.

* * * * *